United States Patent
Dean et al.

(10) Patent No.: US 9,803,127 B2
(45) Date of Patent: Oct. 31, 2017

(54) DRILLING FLUID AND PROCESS OF MAKING THE SAME

(71) Applicant: INEOS USA LLC, Lisle, IL (US)

(72) Inventors: Georgia Dean, LaPorte, TX (US); Vahid Bagheri, League City, TX (US)

(73) Assignee: INEOS USA LLC, Lisle, IL (US)

( * ) Notice: Subject to any disclaimer, the term of this patent is extended or adjusted under 35 U.S.C. 154(b) by 191 days.

(21) Appl. No.: 14/702,959

(22) Filed: May 4, 2015

(65) Prior Publication Data
US 2015/0322324 A1    Nov. 12, 2015

Related U.S. Application Data

(60) Provisional application No. 61/990,371, filed on May 8, 2014.

(51) Int. Cl.
C09K 8/035        (2006.01)
(52) U.S. Cl.
CPC .................................. C09K 8/035 (2013.01)
(58) Field of Classification Search
None
See application file for complete search history.

(56) References Cited

U.S. PATENT DOCUMENTS

| | | | | |
|---|---|---|---|---|
| 5,741,759 A | * | 4/1998 | Gee | C09K 8/26 507/103 |
| 8,030,248 B2 | * | 10/2011 | Lee | C09K 8/28 507/103 |
| 2010/0317550 A1 | | 12/2010 | Lee et al. | |

OTHER PUBLICATIONS

International Searching Authority, International Search Report and Written Opinion issued in PCT/US2015/029004, mailed Aug. 11, 2015, 11 pages.

* cited by examiner

*Primary Examiner* — John J Figueroa
(74) *Attorney, Agent, or Firm* — James J. Drake (57) ABSTRACT

Drilling fluids and processes for making drilling fluids for use in environmentally sensitive areas are provided. The environmentally friendly drilling fluid includes a linear olefin portion that includes linear alpha olefins and/or linear internal olefins with carbon numbers of about 6 carbons to about 30 carbons; and an oligomer portion comprising dimers, trimers, tetramers, and/or heavier oligomers of olefins, wherein the olefins have a carbon number of between about 4 carbons and about 24 carbons, and the oligomer portion includes at least about 50 mole percent of trisubstituted olefin. The drilling fluid has a pour point of about $-10°$ C. or lower, a biodegradation ratio of about 1.0 or less, a toxicity ratio of about 1.0 or less, a Marine Bodis of at least about 60%, a flash point of about $110°$ C. or higher, a viscosity less than about 4 cSt at $40°$ C., a density of about 0.78 to about 0.83 gram/ml, and a log Pow of greater than about 3.

30 Claims, 4 Drawing Sheets

DRILLING FLUID AND PROCESS OF MAKING THE SAME

This application claims the benefit of U.S. Provisional Application No. 61/990,371, filed May 8, 2014, which is incorporated in its entirety herein by reference.

A drilling fluid is provided that includes a linear olefin portion and an oligomer portion. More specifically, the drilling fluid has a low pour point, good biodegradation and low toxicity.

BACKGROUND

Drilling fluids lubricate drilling components and carry cuttings to a surface of a borehole. Conventional drilling fluids include diesel and kerosene hydrocarbons which have poor biodegradability and/or toxicity when used in environmentally sensitive areas, such as marine environments. Synthetic drilling fluids seek to improve biodegradability, toxicity, and pour point properties. Recent changes in environmental legislation allows for the discharge of certain classes of synthetic drilling fluids which meet specific criteria for environmental safety. This increased need for drilling fluids which meet stringent biodegradability and toxicity requirements has created a shortage of environmentally acceptable fluids. Even with the above improvements in the technology, there remains a need and a desire for drilling fluids with a low pour point and less polluting characteristics, such as good biodegradation and low toxicity.

SUMMARY

A drilling fluid includes a linear olefin portion that includes linear alpha olefins and/or linear internal olefins with carbon numbers of about 6 carbons to about 30 carbons. The oligomer portion includes dimers, trimers, tetramers, and/or heavier oligomers of olefins. In this aspect, the olefins have a carbon number of between about 4 carbons and about 24 carbons, and the oligomer portion includes at least about 50 mole percent of trisubstituted olefin. The drilling fluid has a pour point of about −10° C. or lower, a biodegradation ratio of about 1.0 or less, a toxicity ratio of about 1.0 or less, a Marine Bodis of at least about 60%, a flash point of about 110° C. or higher, an olefin content of 90 weight % or higher, a viscosity less than about 4 cSt at 40° C., a density of about 0.78 to about 0.83 gram/ml, and a log Pow of greater than about 3.

A process for producing a drilling fluid includes oliogmerizing olefins having a carbon number between about 4 carbons and about 24 carbons to form an oligomer portion, wherein the oligomer portion is formed with acid type catalyst. The process further includes blending the oligomer portion with a linear olefin portion to form the drilling fluid.

BRIEF DESCRIPTION OF FIGURES

The above and other aspects, features and advantages of several aspects of the process will be more apparent from the following figures.

DETAILED DESCRIPTION

The following description is not to be taken in a limiting sense, but is made merely for the purpose of describing the general principles of exemplary embodiments. The scope of the invention should be determined with reference to the claims.

A drilling fluid is provided suitable for use in environmentally sensitive areas. The drilling fluid passes pre-screening in accordance with OSPAR Recommendation 2000/4, as amended by OSPAR Recommendation 2008/1 and 2010/4, 2012-05, with a Marine Bodis of at least 60% as measured by OECD 301A, B, C, D or F and receives an OCNS grouping of either D, with a minimum aquatic toxicity of >100, in another aspect >1000, and a minimum Sediment toxicity of >1,000, and in another aspect, >10,000, with no substitution warning, as listed on the Centre for Environment, Fisheries and Aquaculture Science (CEFAS) definitive ranked lists of registered products.

In another aspect, a drilling fluid is provided suitable for use in environmentally sensitive areas. The drilling fluid passes pre-screening in accordance with OSPAR Recommendation 2000/4, as amended by OSPAR Recommendation 2008/1 and 2010/4, 2012-05, with a Marine Bodis of at least 60% as measured by OECD 301A, B, C, D or F and receives an OCNS grouping of either E, with a minimum aquatic toxicity of >100, in another aspect >1000, and a minimum Sediment toxicity of >1,000, and in another aspect, >10,000, with no substitution warning, as listed on the Centre for Environment, Fisheries and Aquaculture Science (CEFAS) definitive ranked lists of registered products.

In another aspect, the drilling fluid meets the following criteria; has a flashpoint of at least 120° C. using ASTM D 93, a Kinematic Viscosity @ 40° C. of <3 centistokes, and a Log Pow of >3 as measured by OECD 117, and a density of 0.79-0.82 as measured by ASTM D 1298 with >90% Olefin content, as specified by CONAMA Resolution 23/94 (National Council for the Environment) and administered by Brazilian Institute of Environment and Renewable Natural Resources (IBAMA).

Environmentally friendly broadly refers to materials and/or substances that can be used in and/or are compatible with plant life, animal life, marine life, and/or the like. Environmentally sensitive areas may include freshwater ecosystems, salt water ecosystems (offshore), temperate ecosystems, polar ecosystems (cold climates like Arctic regions and/or Antarctic regions), rainforest ecosystems, wetland ecosystems, arid ecosystems, and/or the like. Desirably, the environmentally friendly materials and/or substances may include good and/or improved biodegradability and/or toxicity. Drilling fluids suitable for use in environmentally sensitive areas may also be suitable for use in other less environmentally sensitive areas. According to one aspect, the drilling fluid meets and/or exceeds standards for materials used in the Gulf of Mexico (GMG290000 and TXG330000), such as for deepwater offshore oil drilling as well as the standards for acceptability as defined by CEFAS (Centre for Environment, Fisheries and Aquaculture Science).

Drilling fluid and/or well fluid base oil broadly refers to any suitable substance and/or material used in boring and/or making a hole and/or tunnel, such as for extracting and/or removing crude oil, natural gas, bitumen, tar sands, sulfur, other elements, other compounds, other minerals, and/or the like. The fluid can be used in rotary drilling applications and/or the like. Drilling fluids may include solutions, mixtures, emulsions, slurries, suspensions, and/or the like. Drilling fluids may be predominately hydrocarbon based and/or predominantly water based.

Drilling fluid may sometimes be referred to as drilling mud, spotting fluid, lubricating additive, circulating fluid, completion fluid and/or the like. The fluid can lubricate downhole equipment, such as a drill string and/or a drill bit. The fluid can also provide a carrier and/or transport for cuttings and/or other debris from a drilling process. The fluid can also form a filter cake, such as to prevent excursions into surrounding formations and/or media. The drilling fluid can also have a suitable density, such as to have hydrolytic stability.

A drilling fluid is provided that includes a linear olefin portion and an oligomer portion. The drilling fluid may include any suitable amount of a linear olefin portion, such as between about 0.1 weight percent and about 60 weight percent, in another aspect, between about 1 weight percent and about 50 weight percent, and in another aspect, between about 10 weight percent and about 30 weight percent. The remaining percentage of components in the drilling fluid may include any suitable amount of an oligomer portion.

In one aspect, the drilling fluid has an olefin content of about 90 weight percent or more, in another aspect, about 92 weight percent or more, and in another aspect, about 95 weight percent or more.

The drilling fluid may further include linear alpha olefins, linear internal olefins, branched olefins, branched internal olefins, esters, water, mineral oils, enhanced mineral oils, oil-in-water emulsions, water-in-oil emulsions, paraffins, fatty acids, or mixtures thereof.

Linear Olefin Portion

The linear olefin portion includes linear alpha olefins and/or linear internal olefins with carbon numbers of about 6 carbons to about 30 carbons.

Olefins broadly refer to unsaturated hydrocarbons, such as having at least one double. Alpha olefins broadly refer to having a point of unsaturation at a terminal and/or end atom of a chain length, such as 1-octene. Internal olefins broadly refer to having a point of unsaturation at a nonterminal and/or inside atom of a chain length, such as 3-octene. Olefins may be formed by any suitable process, such as oligomerization, metathesis, isomerization, cracking, dehydrogenation, and/or the like.

Linear alpha olefin, broadly refers to having and/or forming an at least relatively straight and/or unbranched chain (up to 50% branching). In one aspect, the linear alpha olefin can include any suitable length and/or size of molecule, such as a chain length in a range of between about C6 and about C80, in another aspect, between about C12 and about C48, in another aspect, between about C16 and about C32, in another aspect, between about C16 and about C24, and in another aspect, about C16. Some examples of commercially available linear alpha olefin are those produced by INEOS Oligomers (League City, Tex., U.S.A.) and available as product designations C14LAO and C1618IO.

Internal olefins broadly refer to having a point of unsaturation at a nonterminal and/or inside atom of a chain length. Linear internal olefins include C6 to C30 internal olefins. Some examples of internal olefins include 3-octene, 3-hexene and 3-decene.

According to one aspect, the linear olefin portion can include isomerized vinylidene olefins. Vinylidene broadly refers a structure in which a carbon to carbon double bond contains two hydrogen atoms at a terminal carbon atom and two alkyl substituent structures on an internal carbon atom. The vinylidene olefins can have any suitable chain length, such as a chain length of between about C6 and about C48, between about C12 and about C24, between about C16 and about C18, and/or the like. Desirably, but not necessarily, the vinylidene olefin can include hexadecene.

Vinylidene olefins can be made by any suitable chemistry, process, method, and/or the like. According to one embodiment, the vinylidene olefin can be made by alkyl aluminum catalyzed dimerization of a suitable molecule, such as 1-hexene, 1-octene, 1-decene, and/or the like.

Isomerized olefins can be made by any suitable chemistry, process, method, and/or the like. Isomerized broadly refers to having been changed and/or rearranged, such as a different chemical structure, but a same chemical formula. For example 1-hexadecene can be isomerized to 6-hexadecene. According to one embodiment, an isomerization catalyst can include a metal oxide, and/or the like.

Oligomer Portion

According to one aspect, the drilling fluid may include an oligomer portion that includes oligomerized olefins. Oligomer broadly refers to molecules and/or compounds containing two or greater monomers and/or structural units, such as between about 2 and about 20, between about 2 and about 10, between about 2 and about 5, less than about 5, and/or the like. Monomers refer to single units of molecules, compounds, and/or units, such as such as alpha olefins, linear olefins, linear alpha olefins, internal olefins, linear internal olefins, branched olefins, branched alpha olefins, branched internal olefins, mixtures thereof, and/or the like. Dimers refer to oligomers with 2 units, trimers refer to oligomers with 3 units, tetramers refer to oligomers with 4 units, and pentamers refer to oligomers with 5 units.

Oligomers may include monomers with the same chain length and/or mixtures of monomers with different chain lengths. The oligomer portion can include oligomers made from monomers with any suitable chain length, such as between about C4 and about C24, in another aspect, between about C4 and about C18, in another aspect, between about C4 and about C12, in another aspect, between about C6 and about C10, and in another aspect, about C6 or C8.

The oligomerized olefins can include any suitable molecule and/or compound, such as alpha olefins, linear olefins, linear alpha olefins, internal olefins, linear internal olefins, branched olefins, branched alpha olefins, branched internal olefins, mixtures thereof, and/or the like.

The oligomer portion may have any suitable distribution and/or amount of oligomers, such as dimers, trimers, tetramers, heavier oligomers, and/or the like. Desirably, but not necessarily, the oligomerized olefins can include predominantly dimers and trimers and tetramers of a suitable monomer, such as 1-hexene, 1-octene, 1-decene, and/or the like. Predominantly broadly refers to for the most part, such as at least greater than about 50 weight percent, at least about 70 weight percent, at least about 90 weight percent, and/or the like.

The oligomerized olefins can have any suitable ratio of one oligomer to another, such as a dimer to trimer ratio of less than about 1:1, and in another aspect, greater than about 1:1. According to one embodiment, oligomerized olefins can include predominantly dimers and trimers of 1-octene with a dimer to trimer ratio of greater than about 1:1.

The oligomerized olefins can have any suitable amount of an oligomer, such as at least about 30 weight percent dimer, at least about 60 weight percent dimer, at least about 90 weight percent dimer, and/or the like.

The oligomerized olefins can have any suitable ratio of one oligomer to another, such as a trimer to tetramer ratio of less than about 1:1, greater than about 1:1 and/or the like. According to one aspect, oligomerized olefins can include predominantly trimers and tetramers of 1-hexene with a trimer to tetramer ratio of greater than about 1:1.

The oligomerized olefins can have any suitable amount of oligomer, such as at least about 30 weight percent trimer, in another aspect, at least about 40 weight percent trimer, and in another aspect, at least about 50 weight percent trimer.

Trisubstituted olefin functionality broadly refers to molecules, compounds, and/or components in which a carbon to carbon double bond connects to three carbons atoms and one hydrogen atom, such as to form a generally branched structure. The oligomer portion can include any suitable amount of trisubstituted olefin functionality, such as at least about 30 weight percent, in another aspect, at least about 50 weight percent, in another aspect, at least about 60 weight percent, in another aspect, at least about 70 weight percent, in another aspect, at least about 80 weight percent, and in another aspect, at least about 90 weight percent.

In another aspect, the oligomer portion may include predominantly dimers and trimers of 1-octene with a dimer to trimer ratio of greater than about 1:1; wherein said oligomer portion includes predominantly dimers and trimers of 1-octene with a dimer to trimer ratio of greater than about 1:1; wherein said oligomer portion includes at least about 90 weight percent dimer; wherein said oligomer portion includes predominantly trimers of 1-hexene with trimer content of greater than 30 weight percent; wherein said oligomer portion includes predominantly trimers of 1-hexene with trimer content of greater than 40 weight percent; wherein said oligomer portion includes predominantly trimers of 1-hexene with trimer content of greater than 50 weight percent.

In another aspect, the drilling fluid may include about 50 weight percent oligomer portion and 50 weight percent of a C14 linear olefin; wherein the drilling fluid has a pour point of about −20° C. or lower; wherein the fluid has a pour point of about −25° C. or lower; wherein the drilling fluid has a minimum flash point of 120° C.; wherein the drilling fluid has a density 0.79-0.82 gram/ml; and wherein the fluid has a viscosity less than 3 cSt at 40° C.

In another aspect, the drilling fluid can include a linear olefin portion that has between about 5 weight percent to about 95 weight percent of olefins with a chain length in a range of between about C12 and about C48. The oligomer portion can include at least about 50 weight percent trisubstituted olefin functionality.

In another aspect, the drilling fluid may include a carbon number distribution and an olefin distribution as described below.

| Carbon Number | Weight Percent | More Preferred Weight Percent |
|---|---|---|
| C12 | 1-4 | 1.4-3.5 |
| C14 | 1-55 | 20-55 |
| C16 | 0.1-50 | 0.2-45 |
| C18 | 15-50 | 20-43 |
| C20+ | 8-20 | 8-18.5 |
| C24 | 1-30 | 1.5-25 |
| C24+ | 2-25 | 2.5-20 |

| Olefin | Mole Percent | More Preferred Mole Percent |
|---|---|---|
| vinyl | 30-55 | 33-53.5 |
| internal olefin | 5-60 | 5.5-57.5 |
| trisubstituted olefin | 15-50 | 17-45 |
| vinylidene | 2-25 | 3-23 |

Process for Making a Drilling Fluid

A process for producing a drilling fluid includes oliogmerizing olefins having a carbon number between about 4 carbons and about 24 carbons to form an oligomer portion; and blending the oligomer portion with a linear olefin portion.

The process includes oligomerizing linear alpha olefins, linear internal olefins, branched alpha olefins, branched internal olefins, branched olefins, mixtures thereof, and/or the like. A feedstock for the step of oligomerizing may include molecules and/or monomers with any suitable chain length, such as with a chain length of between about C4 and about C24, in another aspect, between about C4 and about C12, in another aspect, between about C6 and about C10, and in another aspect, between about C6 and about C8.

The oligomerized olefins can be made by any suitable chemistry, process, method, and/or the like. According to one embodiment, the oligomerized olefins can be made and/or formed by acid type catalysts. Acid catalysts may include materials and/or substances with a pH of less than about 7.0, functioning as electron acceptors (Lewis acids), and/or the like. Catalyst broadly refers to materials and/or substances that change and/or affect a rate of a chemical reaction and/or transformation, such as by lowering activation energy and/or speeding up the reaction. Catalysts can be homogenous, heterogeneous, and/or the like. Desirably, catalysts participate in, but do not become consumed by the reaction. Oligomerization catalysts may include sulfuric acid, alkyl aluminum, metal halides, boron trifluoride and/or the like.

According to one aspect, the acid type catalyst of the process using boron trifluoride catalyst and a promoter system comprising at least one protic compound(s) or some combination of protic and aprotic promoters; 1-butanol or 1-propanol are specific examples of protic promoter compounds and butyl acetate is an example of an aprotic promoter used in combination with the alcohol promoter.

The step of oligomerizing can use acid type catalysts, such as boron trifluoride promoted with a protic co-catalyst, an aprotic co-catalyst, and mixtures thereof. According to one aspect, the acid type catalysts of the process uses boron trifluoride promoted by an alcohol alkoxylate, such as 2-methoxyethanol or 1-methoxy-2-propanol. The step of oligomerizing may form any suitable distribution of molecules and/or compounds, such as predominantly dimers and trimers of 1-octene with a dimer to trimer ratio of greater than about 1:1. Desirably, but not necessarily, the process may further include the step of purifying the oligomer portion to include at least about 90 weight percent dimer. Any suitable purification step, method, and/or process can be used for purification, such as distillation, extraction, and adsorption.

In another aspect, the step of oligomerizing may form any suitable distribution of olefins and/or compounds, such as predominantly trimers and tetramers of 1-hexene with a trimer to tetramer ratio of greater than about 1:1. Desirably, but not necessarily, the process may further include the step of purifying the oligomer portion to include at least about 90 weight percent trimer. Any suitable purification step can be used for purification, such as distillation, extraction, and adsorption. The process may use any of the catalysts with respect to the drilling fluids described herein, such as a heterogeneous solid acid catalyst. The solid acid catalyst can be any suitable material, such as polymeric resin.

According to one aspect, the acid type catalyst of the process using boron trifluoride catalyst and a promoter system comprising at least one protic compound(s) or some combination of protic and aprotic promoters; 1-butanol or 1-propanol are specific examples of protic promoter compounds and butyl acetate is an example of an aprotic promoter used in combination with the alcohol promoter.

Desirably, the step of oligomerizing with the solid acid catalyst forms and/or makes predominantly dimers and trimers of 1-octene with a dimer to trimer ratio of greater than about 1:1. The materials and/or compounds made with the solid acid catalyst may also be purified so the oligomer portion may include at least about 90 weight percent dimer.

According to one aspect, the process may further include the step of isomerizing vinylidene olefins. The vinylidene olefins can have any suitable chain length, such as a chain length of between about C12 and about C24. Desirably, the isomerization forms the linear olefin portion. The vinylidene olefins may include hexadecene, for example.

The process may also include the step of dimerizing 1-octene catalyzed by alkyl aluminum to form the vinylidene olefins, according to one embodiment.

In one aspect, the process includes providing a linear olefin portion having between about 5 weight percent to about 95 weight percent of olefins with a chain length in the range of between about C12 and about C48. The linear olefin portion can include at least about 50 weight percent trisubstituted olefin functionality. The process can also include the step of mixing the linear olefin portion with an oligomer portion.

Drilling Fluid Characteristics

The drilling fluid can have any suitable pour point such as at least about 0° C. or lower, in another aspect, at least about −10° C. or lower, in another aspect, at least about −15° C. or lower, in another aspect, at least about −20° C. or lower, in another aspect, at least about −25° C. or lower, in another aspect, at least about −30° C. or lower, in another aspect, at least about −35° C. or lower, in another aspect, at least about −40° C. or lower, in another aspect, at least about −45° C. or lower, and in another aspect, at least about −50° C. or lower. Pour point broadly refers to a lowest temperature a fluid will pour and/or flow.

The linear olefin portion can have any suitable pour point, such as at least about −10° C. or lower, in another aspect, at least about −20° C. or lower, in another aspect, at least about −30° C. or lower, in another aspect, at least about −40° C. or lower, in another aspect, at least about −50° C. or lower, in another aspect, at least about −60° C. or lower, and in another aspect, at least about −65° C. or lower.

The oligomer portion can have any suitable pour point, such as at least about 15° C. or lower, in another aspect, at least about 0° C. or lower, in another aspect, at least about −9° C. or lower, and in another aspect, at least about −15° C. or lower.

Desirably, but not necessarily, the linear olefin portion can act as and/or function as a pour point depressant and/or lowering agent, such as to lower a pour point of the fluid lower than a pour point of the second fluid component alone (neat) by at least about 2° C., in another aspect, at least about 5° C., in another aspect, at least about 10° C., and in another aspect, at least about 20° C.

The drilling fluid can have any suitable viscosity, such as between about 0.1 centistokes to about 20 centistokes, in another aspect, between about 1.0 centistoke and about 10 centistokes, and in another aspect, between about 1.4 centistokes and about 6.0 centistokes, when measured at 40° C.

According to one embodiment, the fluid can have a biodegradation ratio of less than or equal to about 1.0 as measured by United States Environmental Protection Agency NPDES 2012 (National Pollution Discharge Elimination System) General Permit for New and Existing Sources and New Discharges in the Offshore Subcategory of the Oil and Gas Extraction Category for the Western Portion of the Outer Continental Shelf of the Gulf of Mexico (GMG290000 and TXG330000), Protocol for the determination of degradation of Non-Aqueous base fluids in a marine closed bottle biodegradation test system, modified International Organization for Standardization (ISO) 11734: 1995 method. The biodegradation test compares the fluid to a reference standard of internal olefin molecules having 65 mole percent of molecules with a carbon number of 16 carbons and 35 mole percent of molecules with a carbon number of 18 carbons.

The biodegradation ratio can be defined by the equation below with numerators and denominators both based on percent, where a value of 1.054 or less forms an acceptable result.

$$\text{Biodegradation Ratio} = \frac{\text{theoretical gas production of reference standard}}{\text{theoretical gas production of test fluid}}$$

Desirably, the fluid has a biodegradation ratio of less than or equal to about 1.0, in another aspect, less than or equal to about 0.95, in another aspect, less than or equal to about 0.9, and in another aspect, less than or equal to about 0.85. Biodegradation may be by anaerobic pathways and/or routes.

The entire teachings and contents of the U.S. Environmental Protection Agency's Final NPDES 2012 General Permit for New and Existing Sources and New Discharges in the Offshore Subcategory of the Oil and Gas Extraction Category for the Western Portion of the Outer Continental Shelf of the Gulf of Mexico (GMG290000 and TXG330000) with all supplements and/or notations and International Organization for Standardization 11734:1995 method are hereby incorporated by reference into this specification in their entirety.

In one aspect, the drilling fluid can have an improved biodegradability of at least about 5 percent over both a biodegradability of the linear olefin portion alone and the oligomer portion alone, in another aspect, at least about 10 percent over both a biodegradability of the linear olefin portion alone and the oligomer portion alone, in another aspect, at least about 15 percent over both a biodegradability of the linear olefin portion alone and the oligomer portion alone, in another aspect, at least about 20 percent over both a biodegradability of the linear olefin portion alone and the oligomer portion alone, in another aspect, at least about 25 percent over both a biodegradability of the linear olefin portion alone and the oligomer portion alone, and in another aspect, at least about 30 percent over both a biodegradability of the linear olefin portion alone and the oligomer portion alone.

According to one aspect, the fluid can have a toxicity ratio of less than or equal to about 1.0. as measured by American Society for Testing and Materials (ASTM) method E1367-99 testing protocol as required in the United States Environmental Protection Agency NPDES 2012 (National Pollution Discharge Elimination System) General Permit for New and Existing Sources and New Discharges in the Offshore Subcategory of the Oil and Gas Extraction Category for the Western Portion of the Outer Continental Shelf of the Gulf of Mexico (GMG290000 and TXG330000) which uses *Leptocheirus Plumulosus* in a 10-day sediment toxicity test. The toxicity test compares the fluid to a reference standard of internal olefin molecules having 65 mole percent of molecules with a carbon number of 16 carbons and 35 mole percent of molecules with a carbon number of 18 carbons.

The toxicity ratio can be defined by the equation below and based on weight percent, where a value of 1.054 or less forms an acceptable result and $LC_{50}$ represents a concentration in milligrams per liter needed to kill half a sample population of a test subject.

$$\text{Toxicity Ratio} = \frac{\text{10-day } LC_{50} \text{ of reference standard}}{\text{10-day } LC_{50}}$$

Desirably, the fluid has a toxicity ratio of less than or equal to about 1.0, in another aspect, less than or equal to about 0.95, in another aspect, less than or equal to about 0.9, and in another aspect, less than or equal to about 0.85, and/or the like. The entire teachings and contents of American Society for Testing and Materials method E1367-99 testing protocol are hereby incorporated by reference into this specification in their entirety.

According to one aspect, the drilling fluid can have an improved toxicity of at least about 5 percent over both a toxicity of the linear olefin portion alone and the oligomer portion alone, in another aspect, at least about 10 percent over both a toxicity of the linear olefin portion alone and the oligomer portion alone, in another aspect, at least about 15 percent over both a toxicity of the linear olefin portion alone and the oligomer portion alone, in another aspect, at least about 20 percent over both a toxicity of the linear olefin portion alone and the oligomer portion alone, in another aspect, at least about 25 percent over both a toxicity of the linear olefin portion alone and the oligomer portion alone, and in another aspect, at least about 30 percent over both a toxicity of the linear olefin portion alone and the oligomer portion alone.

According to one aspect, the drilling fluid can have and OCNS grouping of a D, or a grouping of an E, with no substitution warning, in accordance with the OSPAR recommendation 2000/4, as amended 2008/1, 2010/4 and 2012/5, as listed on the Centre for Environment Fisheries and Aquaculture Science (CEFAS) definitive ranked list of registered products.

According to one embodiment, the fluid will meet the minimum criteria for use as specified by the National Council for the Environment (CONAMA) Resolution 23/94 as administered by the Brazilian Institute of Environment and Renewable Natural Resources (IBAMA), which includes the biodegradation and toxicity testing protocol as defined in the U.S. Environmental Protection Agency's Final NPDES 2012 General Permit for New and Existing Sources and New Discharges in the Offshore Subcategory of the Oil and Gas Extraction Category for the Western Portion of the Outer Continental Shelf of the Gulf of Mexico (GMG290000 and TXG330000) as outlined herein.

Without being bound by theory of operation, generally larger molecules, such as carbon numbers above C18, have a lower (poorer) biodegradability factor, since it is a larger molecule and takes a longer time for microbes to digest the larger molecule. Generally larger molecules have a higher (better) toxicity factor, since smaller molecules break down into compounds that are toxic when consumed into microbes. Since larger molecules break down into remaining large compounds, the larger molecules may not be readily consumed into the microbes and result in a better toxicity factor.

Surprisingly and unexpectedly, the linear olefin portion has an improved biodegradation and a good toxicity when blended with the oliogomer portion. Without being bound by theory, the trisubstituted and/or branched molecules may provide multiple points for microbes to attack and/or digest the molecule to allow for better biodegradation while remaining large enough to have lower toxicity.

Surprisingly and unexpectedly, the linear olefin portion with higher carbon numbers, such as at least about 20 weight percent C24, has a good biodegradation. Also surprisingly and unexpectedly, the oligomer portions with lower carbon numbers, such as at least 50 weight percent C14 has satisfactory toxicity ratios.

Desirably, the drilling fluid and/or fluid components of the drilling fluid do not include and/or contain polycyclic aromatic hydrocarbons and/or polynuclear aromatic hydrocarbons, such as liquids made by synthetic processes and/or steps. The linear olefin portion can include any minimal amount and/or content of polycyclic aromatic hydrocarbons and/or polynuclear aromatic hydrocarbons, such as less than about 0.00001 grams of polycyclic aromatic hydrocarbons per gram of a base fluid (passing test level), about 0 grams of polycyclic aromatic hydrocarbons per gram of a base fluid as measured by Method 1654A, as published in Methods for the Determination of Diesel, Mineral and Cruse Oils in Offshore Oil and Gas Industry Discharges.

Similarly, the drilling fluid including both the linear olefin portion and the oligomer portion may include any minimal amount or content of polycyclic aromatic hydrocarbons or polynuclear aromatic hydrocarbons, such as less than about 0.00001 grams of polycyclic aromatic hydrocarbons per gram of a base fluid, about 0 grams of polycyclic aromatic hydrocarbons per gram of a base fluid.

In another aspect, the drilling fluid has a minimum 96-hour LC50 of 30,000 ppm in a seawater to drilling fluid suspended particulate phase (SPP) volumetric ratio using *Mysidopsis bahia* or *Mysis relicta* as identified in Appendix 2 to Subpart A of Part 435—Drilling Fluids Toxicity Test (EPA Method 1619) in 40 CFR Part 435.

According to one embodiment, the linear olefin portion is not isomerized and/or hydrogenated (saturated). In the alternative, the linear olefin portion may be isomerized and/or hydrogenated.

EXAMPLES

The following examples illustrate the preparation and testing of base fluids with a toxicity enhancement component. Biodegradation and toxicity ratios were measured against a reference sample and according to the NPDES testing protocol described herein. Carbon number distribution was analyzed using gas chromatography techniques. Olefin distribution was analyzed using nuclear magnetic resonance techniques.

First Example Set

The material of Example 1A was prepared by oligomerizing 1-octene using a boron trifluoride catalyst with 2-methoxyethanol as a promoter, according to Theriot, U.S. Pat. No. 5,068,487. The entire contents and teachings of Theriot, U.S. Pat. No. 5,068,487 are hereby incorporated by reference in its entirety. The resultant material was then distilled to have the unreacted monomer removed and the balance of the material was collected to form the material of Example 1A. The material of Example 4 was prepared by blending 50 weight percent of the material of Example 1A and 50 weight percent of the material of Example 2A to form Example 4. Example 2A (C14LAO) is a commercially available linear alpha olefin, from Ineos Oligomers, based in League City, Tex., U.S.A. Table 1 shows the analysis of the materials of Example 1A, Example 2A and the blended sample represented as Example 4.

TABLE 1

|  | Example 1A | Example 2A | Example 4 |
| --- | --- | --- | --- |
| Biodegradation Ratio | 4.99 | 0.4 | 0.9 |
| Toxicity Ratio | 1.3 | 2.1 | 0.9 |
| Carbon Number Distribution (weight percent) | | | |
| C14 | 1.51 | 98.64 | 52.58 |
| C16 | 69.75 | 1.2 | 29.09 |
| C20+ | 28.74 | 0 | 18.33 |
| Viscosity, mm$^2$/s | | | |
| 40° C. | 4.5 | 1.87 | 2.55 |
| 100° C. | 1.5 | 0.87 | 1.06 |
| Pour Point | −66 | −18 | −29 |
| Density | 0.80 | 0.78 | 0.79 |
| Flashpoint | 134 | 117 | 127 |
| Olefin Distribution (mole Percent) | | | |
| Vinyl | 3.6 | 78.9 | 41.25 |
| Internal Olefins | 6.08 | 4.9 | 5.49 |
| Trisubstituted Olefins | 88.44 | — | 44.22 |
| Vinylidene | 1.88 | 16.2 | 9.04 |

Figure 1:
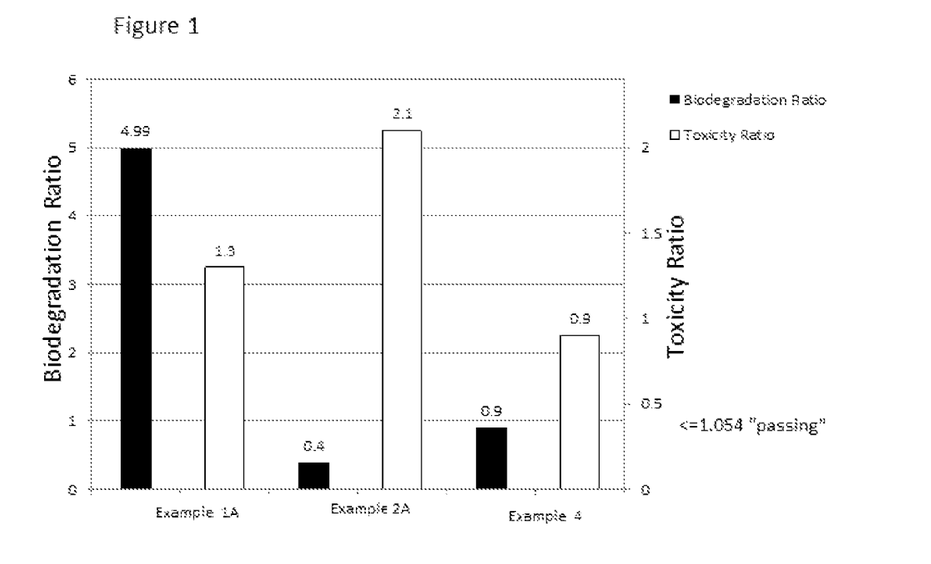
FIG. 1 shows a bar graph of the toxicity and biodegradation ratios of compositions from Example 1A, Example 2, and Example 4.

FIG. 1 shows a bar graph of both the Toxicity and Biodegradation ratios for each of the following; Example 1A, Example 2A and Example 4, where less than 1.054 is considered an acceptable or "passing" value. Surprisingly and unexpectedly, Example 4 has a toxicity ratio which is better than that of both Examples 1A and Example 2A. The biodegradation ratio of Example 4 also shows a marked improvement over the predicted biodegradation ratio result.

Figure 2:
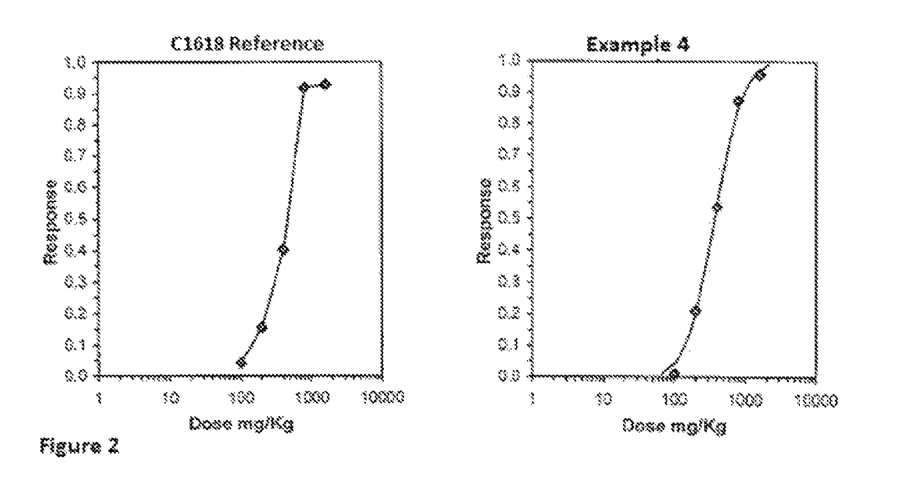
FIG. 2 illustrates a toxicity dose response curve of a composition from Example 4 and a C1618 reference material.

FIG. 2 shows the toxicity Dose response curves of Example 4 and the applicable reference standard as used to calculate the toxicity ratio according to the NPDES testing protocol described above. The dose response curve of Example 4 exhibits a response which is better suited for a probit analysis as per the EPA standard of Eco toxicological calculations.

Second Example Set

The material of Example 5 was prepared by blending a ratio of 20 weight percent of the material of Example 1A and 20 weight percent of the material of Example 2A with 60 weight percent of the material of Example 3 to form Example 5. Example 2A (C14LAO) and Example 3 (C1618IO) are available from Ineos Oligomers based in League City, Tex., U.S.A. Table 2 shows the analysis of the materials of used in the formation of Example 5.

TABLE 2

|  | Example 1A | Example 2A | Example 3 | Example 5 |
| --- | --- | --- | --- | --- |
| Biodegradation Ratio | 4.99 | 0.4 | 1.1 | 1.0 |
| Toxicity Ratio | 1.3 | 2.1 | 1 | 0.9 |
| Carbon Number Distribution (weight percent) | | | | |
| C14 | 1.51 | 98.64 | 0.37 | 27.27 |
| C16 | 69.75 | 1.2 | 55.09 | 43.5 |
| C18 | — | — | 37.43 | 21.04 |
| C20+ | 28.74 | — | 7.1 | 8.7 |
| Viscosity, mm$^2$/s | | | | |
| 40° C. | 4.5 | 1.87 | 3.126 | 3.4 |
| 100° C. | 1.5 | 0.87 | 1.33 | 1.3 |
| Pour Point | −66 | −18 | −15 | −20 |
| Density | 0.82 | 0.78 | 0.78 | 0.79 |
| Flashpoint | 134 | 116 | 120 | 122 |
| Olefin Distribution (mole Percent) | | | | |
| Vinyl | 3.6 | 78.9 | 11 | 33 |
| Internal Olefins | 6.08 | 4.9 | 55.7 | 34.9 |
| Trisubstituted Olefins | 88.44 | — | 26.5 | 20.5 |
| Vinylidene | 1.88 | 16.2 | 6.9 | 11.6 |

Figure 3:
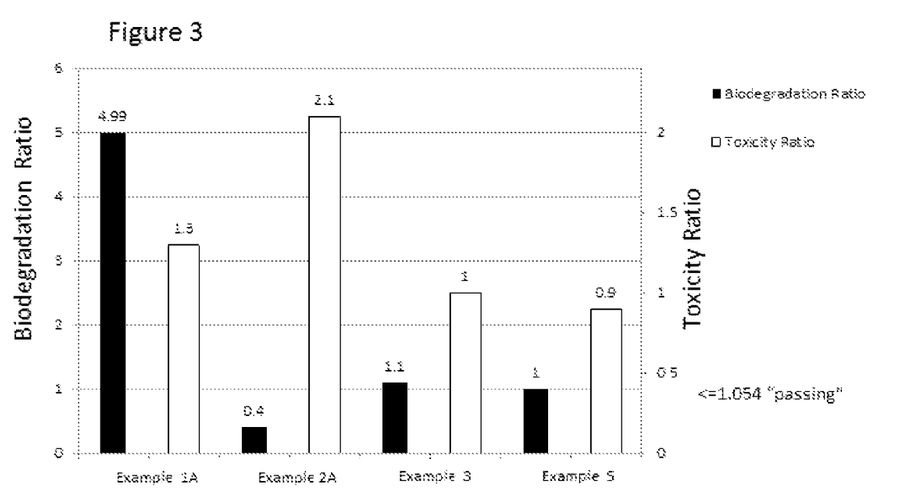
FIG. 3 shows a bar graph of the toxicity and biodegradation ratios of compositions from Example 1A, Example 2, Example 3 and Example 5.

FIG. 3 shows a bar graph of both the Toxicity and Biodegradation ratios for each of the following; Example 1A, Example 2A, Example 3 and Example 5, where less than 1.054 is considered an acceptable or "passing" value. Surprisingly and unexpectedly, Example 5 has a toxicity ratio which is better than that of the material of Example 1A and Example 2A, and similar values to that of Example 3. The biodegradation ratio of Example 5 also shows a marked improvement over the predicted biodegradation ratio result.

Third Example Set

The material of Example 1B was prepared by oligomerizing 1-octene using a boron trifluoride catalyst with 2-methoxyethanol as a promoter, according to Theriot, U.S. Pat. No. 5,068,487. The entire contents and teachings of Theriot, U.S. Pat. No. 5,068,487 are hereby incorporated by reference in its entirety. The resultant material was then distilled to have the unreacted monomer removed and the balance of the material was collected to form the material of Example 1B. The material of Example 6 was prepared by blending a ratio of 50 weight percent of the material of Example 1B and 50 weight percent of the material of Example 2B to form Example 6. Example 2B (C14LAO) is available from Ineos Oligomers based in League City, Tex., U.S.A. Table 3 shows the analysis of the materials of Example 1B, Example 2B and Example 6.

TABLE 3

|  | Example 1B | Example 2B | Example 6 |
|---|---|---|---|
| Biodegradation Ratio | 6.0 | 0.5 | 0.8 |
| Toxicity Ratio | 1.4 | 2.1 | 1.0 |
| Carbon Number Distribution (weight percent) | | | |
| C14 | 2.14 | 98.23 | 54.93 |
| C16 | 62.5 | 1.8 | 30.72 |
| C20+ | 35.36 | — | 14.17 |
| Viscosity, mm$^2$/s | | | |
| 40° C. | 4.4 | 1.87 | 2.36 |
| 100° C. | 1.5 | 0.87 | 1.1 |
| Pour Point | −66 | −18 | −37 |
| Density | 0.81 | 0.78 | 0.79 |
| Flashpoint | 136 | 116 | 126 |
| Olefin Distribution (mole Percent) | | | |
| Vinyl | 4.4 | 75.6 | 40.0 |
| Internal Olefins | 7.4 | 5.1 | 6.25 |
| Trisubstituted Olefins | 87.1 | 3.6 | 45.35 |
| Vinylidene | 1.1 | 15.8 | 8.45 |

Figure 4:
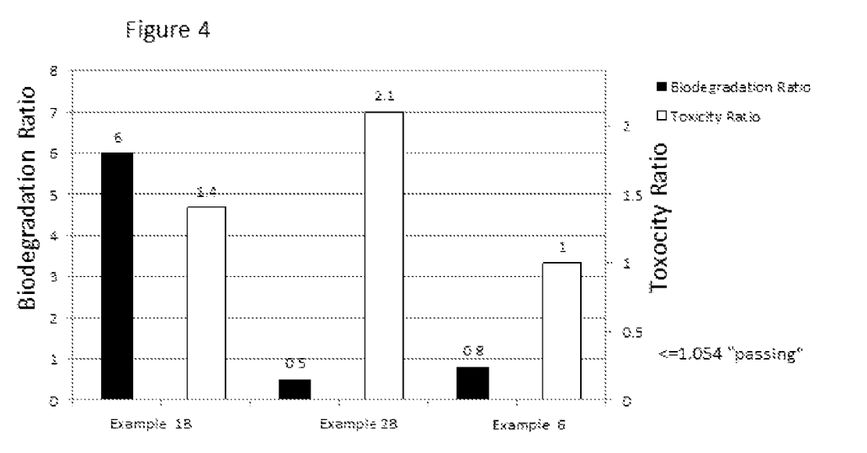
FIG. 4 shows a bar graph of the toxicity and biodegradation ratios of compositions from Example 1B, Example 2 and Example 6.

FIG. 4 shows a bar graph of both the Toxicity and Biodegradation ratios for each of the following; Example 1B, Example 2B and Example 6, where less than 1.054 is considered an acceptable or "passing" value. Surprisingly and unexpectedly, Example 6 has a toxicity ratio which is better than that of the material of Example 1B and Example 2B. Additionally Example 6 has an improved biodegradation ratio over that of the predicted ratio.

Fourth Example Set

The materials in Example 7, Example 8, and Example 9 were prepared by oligomerizing 1-hexene using boron trifluoride catalyst and a promoter system comprising at least one protic compound(s) or some combination of protic and aprotic promoters according to the following patents which illustrate but a few of the many methods describes for making oligomers: see for example U.S. Pat. Nos. 3,682,823; 3,763,244; 3,769,363; 3,780,123; 3,798,284; 3,884,988; 3,097,924; 3,997,621; 4,045,507; and 4,045,508. 1-Butanol or 1-Propanol are specific examples of protic promoter compounds and butyl acetate is an example of an aprotic promoter used in combination with the alcohol promoter such U.S. Pat. No. 3,997,621. Table 4 shows the analysis of 3 materials made from these processes after residual unreacted monomer was removed by distillation. Example 9 was used to prepare both Example 12 and Example 13.

TABLE 4

|  | Example 7 | Example 8 | Example 9 |
|---|---|---|---|
| Biodegradation Ratio | 3.3 | 23.7 | 48.5 |
| Toxicity Ratio | 0.2 | 0.6 | 1.0 |
| Carbon Number Distribution (weight percent) | | | |
| C12 | 2.29 | 7.27 | 9.18 |
| C18 | 38.62 | 55.61 | 61.49 |
| C24 | 35.23 | 23.54 | 19.19 |
| C24+ | 23.84 | 13.57 | 9.59 |
| Viscosity, mm$^2$/s | | | |
| 40° C. | 7.2 | 5.1 | 4.2 |
| 100° C. | 2.0 | 1.6 | 1.3 |
| Pour Point | −66 | −66 | −66 |
| Density | 0.80 | 0.80 | 0.79 |
| Flashpoint | 142 | 130 | 120 |

TABLE 4-continued

|  | Example 7 | Example 8 | Example 9 |
|---|---|---|---|
| Olefin Distribution (mole Percent) | | | |
| Internal Olefins | 6.4 | 7.1 | 7.3 |
| Trisubstituted Olefins | 91 | 89.8 | 89 |
| Vinylidene | 1.9 | 2.1 | 2.3 |

Figure 5:
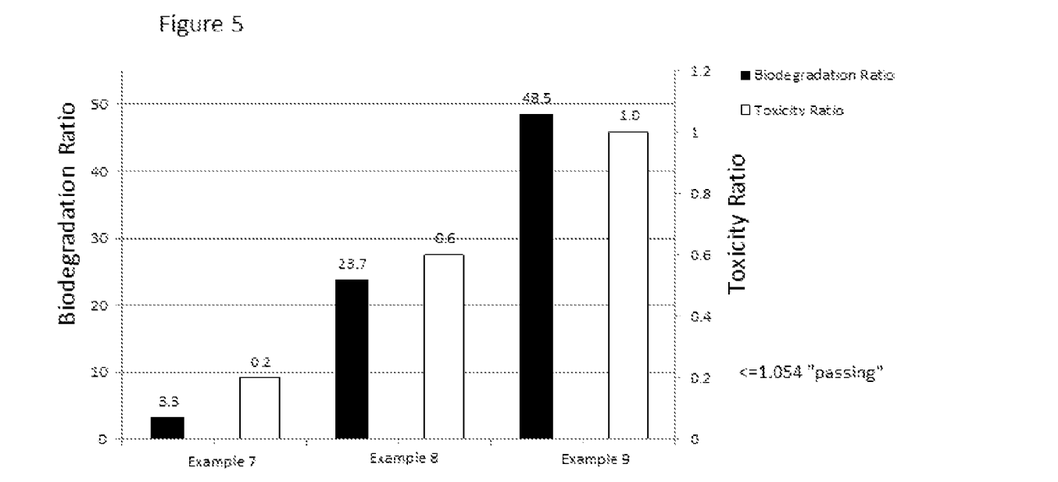
FIG. 5 shows a bar graph of the toxicity and biodegradation ratios of compositions from Example 7, Example 8 and Example 9.

FIG. 5 shows a bar graph of both the Toxicity and Biodegradation ratios for each of the following; Example 7, Example 8 and Example 9 where less than 1.054 is considered an acceptable or "passing" value. Surprisingly all three examples showed a sediment toxicity which was not expected. Specifically Example 7 where the sediment toxicity ratio was substantially lower than expected based on industry perception that trisubstituted molecules are more toxic. Additionally, there existed a clear trend in the data which was also unexpected.

The material of Example 12 was prepared by blending a ratio of 20 weight percent of Example 9 with 80 weight percent of Example 11 (C1618IO) which is available from Ineos Oligomers based in League City, Tex., U.S.A. Table 5 shows the analysis of the materials used in the preparation of Example 12.

TABLE 5

|  | Example 9 | Example 11 | Example 12 |
|---|---|---|---|
| Biodegradation Ratio | 48.5 | 1.1 | 0.9 |
| Toxicity Ratio | 1.0 | 1 | 0.5 |
| Carbon Number Distribution (weight percent) | | | |
| C12 | 9.18 | 0.37 | 1.80 |
| C16 | — | 55.09 | 43.55 |
| C18 | 61.49 | 37.43 | 42.56 |
| C20 | — | 7.1 | 8.39 |
| C24 | 19.19 | — | 1.90 |
| C24+ | 9.59 | — | 2.68 |
| Viscosity, mm$^2$/s | | | |
| 40° C. | 4.2 | 3.126 | 3.3 |
| 100° C. | 1.3 | 1.33 | 1.32 |
| Pour Point | −66 | −15 | −23 |
| Density | 0.79 | 0.78 | 0.78 |
| Flashpoint | 120 | 120 | — |
| Olefin Distribution (mole Percent) | | | |
| Internal Olefins | 7.3 | 55.7 | 57.6 |
| Trisubstituted Olefins | 89 | 26.5 | 39.4 |
| Vinylidene | 2.3 | 6.9 | 3.0 |

Figure 6:
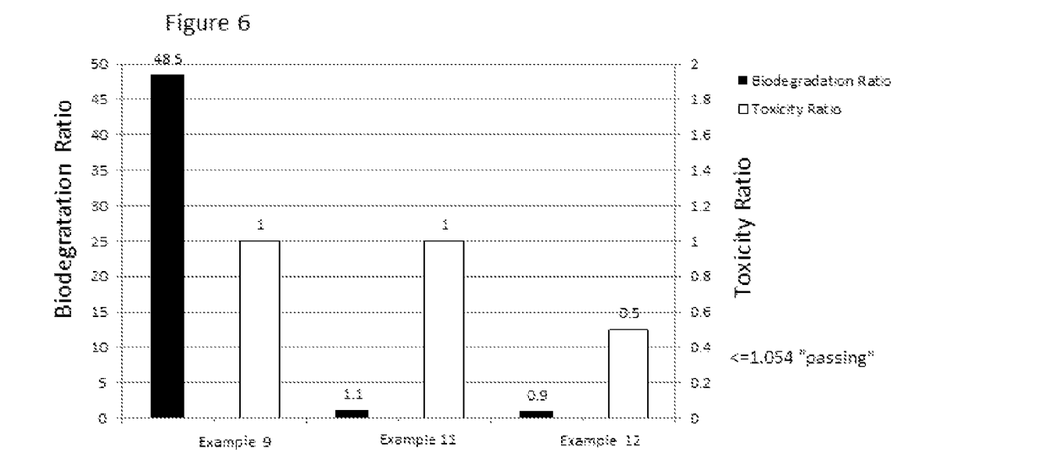
FIG. 6 shows a bar graph of the toxicity and biodegradation ratios of compositions from Example 9, Example 11 and Example 12.

FIG. 6 shows a bar graph of both the Toxicity and Biodegradation ratios for each of the following; Example 9 and Example 10 and Example 12, where less than 1.054 is considered an acceptable or "passing" value. Surprisingly and unexpectedly Example 12 outperformed the individual components which made up the blend.

The material of Example 13 was prepared by blending a ratio of 40 weight percent of Example 9 with 60 weight percent of Example 10 (C16LAO). Table 6 shows the analysis of the materials used in the preparation of Example 13. Example 10 is available from Ineos Oligomers based in League City, Tex., U.S.A.

TABLE 6

|  | Example 9 | Example 10 | Example 13 |
|---|---|---|---|
| Biodegradation Ratio | 48.5 | 1 | 1 |
| Toxicity Ratio | 1.0 | 0.7 | 0.6 |
| Carbon Number Distribution (weight percent) | | | |
| C12 | 9.18 | — | 3.48 |
| C14 | — | 1.63 | 1.11 |
| C16 | — | 96.52 | 45.86 |
| C18 | 61.49 | 1.69 | 23.27 |
| C24 | 19.19 | — | 15.66 |
| C24+ | 9.59 | — | 10.11 |
| Viscosity, mm²/s | | | |
| 40° C. | 4.2 | 2.3 | 3.1 |
| 100° C. | 1.3 | 0.9 | 1.06 |
| Pour Point | −66 | 2 | −29 |
| Density | 0.79 | 0.78 | 0.78 |
| Flashpoint | 120 | 132 | — |
| Olefin Distribution (mole Percent) | | | |
| Vinyl | — | 64.5 | 53.5 |
| Internal Olefins | 7.3 | 6.1 | 6.2 |
| Trisubstituted Olefins | 89 | 2.3 | 17.2 |
| Vinylidene | 2.3 | 27.2 | 23.2 |

Figure 7:
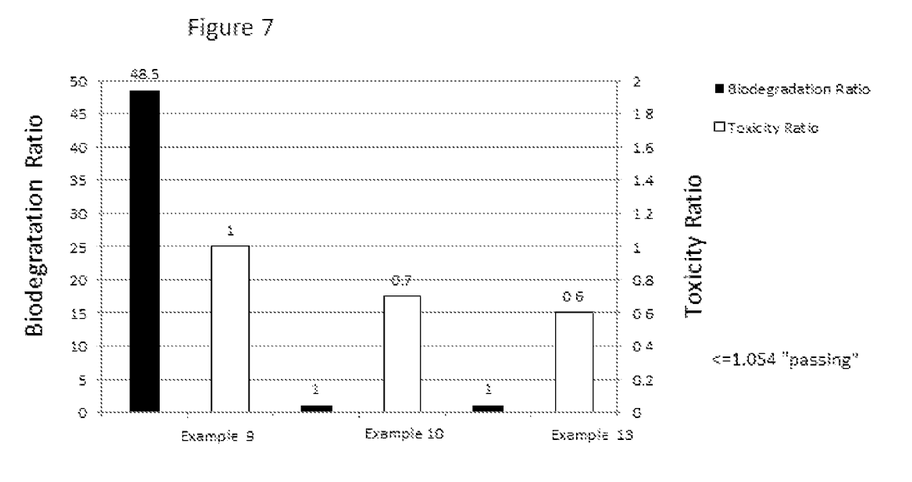
FIG. 7 shows a bar graph of the toxicity and biodegradation ratios of compositions from Example 9, Example 10 and Example 13.

FIG. 7 shows a bar graph of both the Toxicity and Biodegradation ratios of each of the following; Example 9, Example 10 and Example 13, where less than 1.054 is considered an acceptable or "passing" value. Surprisingly and unexpectedly the blend outperformed the individual components which made up the blend.

The material of Example 14 was prepared by blending a ratio of 70 weight percent of Example 7 with 30 weight percent of Example 2C (C14 LAO) is available from Ineos Oligomers based in League City, Tex., U.S.A. Table 7 Shows the analysis of materials used in the preparation of Example 14.

TABLE 7

|  | Example 7 | Example 2C | Example 14 |
|---|---|---|---|
| Biodegradation Ratio | 3.3 | 0.5 | — |
| Toxicity Ratio | 0.2 | 2.1 | 0.7 |
| Carbon Number Distribution (weight percent) | | | |
| C12 | 2.29 | — | 1.40 |
| C14 | — | 98.77 | 28.90 |
| C16 | — | 1.1 | 0.20 |
| C18 | 38.62 | — | 24.10 |
| C24 | 35.23 | — | 25.00 |
| C24+ | 23.84 | — | 20.32 |
| Viscosity, mm²/s | | | |
| 40° C. | 7.2 | 1.85 | 5.5 |
| 100° C. | 2.0 | 0.86 | 1.6 |
| Pour Point | −66 | −18 | −45 |
| Density | 0.80 | 0.78 | 0.79 |
| Flashpoint | 142 | 119 | 130 |
| Olefin Distribution (mole Percent) | | | |
| Vinyl | — | 77.64 | 47.7 |
| Internal Olefins | 6.4 | 5.3 | 6.2 |
| Trisubstituted Olefins | 91 | 0.7 | 35.1 |
| Vinylidene | 1.9 | 14.7 | 11 |

Figure 8:
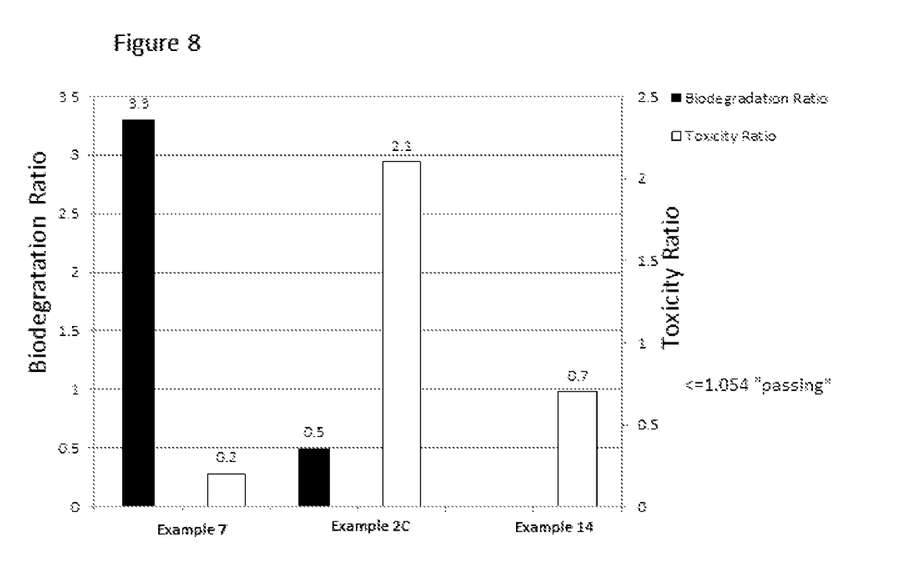
FIG. 8 shows a bar graph of the toxicity and biodegradation ratios of compositions from Example 7, Example 2C and Example 14.

FIG. 8 shows a bar graph of the Toxicity ratios for each of the following: Example 7, Example 2C and Example 14, where less than 1.054 is considered an acceptable or "passing" value. Surprisingly and unexpectedly Example 14 outperformed the individual components which made up the blend.

While the invention herein disclosed has been described by means of specific embodiments, examples and applications thereof, numerous modifications and variations could be made thereto by those skilled in the art without departing from the scope of the invention set forth in the claims.

What is claimed is:

1. A drilling fluid comprising:
   a linear olefin portion that includes linear alpha olefins and/or linear internal olefins with carbon numbers of about 6 carbons to about 30 carbons; and
   an oligomer portion that includes dimers, trimers, tetramers, and/or heavier oligomers of olefins, wherein the olefins have a carbon number of between about 4 carbons and about 12 carbons, and the oligomer portion includes at least about 50 mole percent of trisubstituted olefin,
   wherein the drilling fluid has a pour point of about −10° C. or lower, a biodegradation ratio of about 1.0 or less, a toxicity ratio of about 1.0 or less, a Marine Bodis of at least about 60%, a flash point of about 110° C. or higher, an olefin content of about 90 weight % or higher, a viscosity less than about 4 cSt at 40° C., a density of about 0.78 to about 0.83 gram/ml, and a log Pow of greater than about 3.

2. The drilling fluid of claim 1 wherein the drilling fluid includes about 0.1 to about 60 weight percent of the linear olefin portion.

3. The drilling fluid of claim 2 wherein the drilling fluid includes about 1 to about 50 weight percent of the linear olefin portion.

4. The drilling fluid of claim 1 wherein the linear alpha olefin content is about 50 weight percent C14 and the drilling fluid includes about 50 weight % of the oligomer portion.

5. The drilling fluid of claim 1 wherein said oligomer portion includes predominantly dimers and trimers of 1-octene with a dimer to trimer ratio of greater than about 1:1.

6. The drilling fluid of claim 1 wherein said oligomer portion includes predominantly dimers and trimers of 1-octene with a dimer to trimer ratio of greater than about 1:1; wherein said oligomer portion comprises at least about 90 weight percent dimer.

7. The drilling fluid of claim 1 wherein said oligomer portion comprises predominantly trimers of 1-hexene with trimer content of greater than 30%.

8. The drilling fluid of claim 7 wherein said oligomer portion comprises predominantly trimers of 1-hexene with trimer content of greater than 40%.

9. The drilling fluid of claim 8 wherein said oligomer portion comprises predominantly trimers of 1-hexene with trimer content of greater than 50%.

10. The drilling fluid of claim 1 wherein the fluid has a pour point of about −20° C. or lower.

11. The drilling fluid of claim 1 wherein the fluid has a pour point of about −25° C. or lower.

12. The drilling fluid of claim 1 wherein the fluid has a flash point of about 120° C. or higher.

13. The drilling fluid of claim 1 wherein the fluid has a density of about 0.79 to about 0.82 gram/ml.

14. The drilling fluid of claim 1 wherein the fluid has a viscosity less than about 3 cSt at 40° C.

15. The fluid of claim 1, wherein said oligomer portion have been made by acid type catalysts; wherein said acid type catalysts includes a heterogeneous solid acid catalyst.

16. The drilling fluid of claim 1 wherein said oligomer portion have been made by acid type catalysts; wherein said acid type catalysts include boron trifluoride promoted with a protic co-catalyst, an aprotic co-catalyst, or mixtures thereof.

17. The drilling fluid of claim 1 wherein said oligomer portion have been made by acid type catalysts; wherein said acid type catalysts includes boron trifluoride promoted by an alcohol alkoxylate.

18. The drilling fluid of claim 17 wherein said oligomer portion have been made by acid type catalysts; wherein said acid type catalysts include boron trifluoride promoted by an alcohol alkoxylate; wherein the alcohol alkoxylate comprises 2-methoxyethanol or 1-methoxy-2-propanol.

19. The drilling fluid of claim 1 wherein the drilling fluid has a biodegradation ratio of less than or equal to about 1.0 as measured by United States Environmental Protection Agency NPDES 2012 (National Pollution Discharge Elimination System) General Permit for New and Existing Sources and New Discharges in the Offshore Subcategory of the Oil and Gas Extraction Category for the Western Portion of the Outer Continental Shelf of the Gulf of Mexico (GMG290000 and TXG330000), Protocol for the determination of degradation of Non-Aqueous base fluids in a marine closed bottle biodegradation test system, where the fluid is compared to a reference standard of internal olefin molecules having 65 mole percent of molecules with a carbon number of 16 carbons and 35 mole percent of molecules with a carbon number of 18 carbons.

20. The drilling fluid of claim 1 wherein the drilling fluid has an improved biodegradability of at least about 20 percent over biodegradability of said oligomer portion component alone.

21. The drilling fluid of claim 1 wherein the drilling fluid has a toxicity ratio of less than or equal to about 1.0, as measured by American Society for Testing and Materials method E1367-99 testing protocol as required in the United States Environmental Protection Agency NPDES 2012 (National Pollution Discharge Elimination System) General Permit for New and Existing Sources and New Discharges in the Offshore Subcategory of the Oil and Gas Extraction Category for the Western Portion of the Outer Continental Shelf of the Gulf of Mexico (GMG290000 and TXG330000) which uses *Leptocheirus Plumulosus* or *Lytechinus variegatus, Menidia Beryllina, Daphnia magma, Daphnia similis, Salmonella* sp, *Pseudokirchneriella subcapitada, Diaphanosoma brachyurum, Grandidierella* sp, *Corophium volutator* or *Mysidopsis Bahia* in a 10-day sediment toxicity test to compare the fluid to a reference standard of internal olefin molecules having 65 mole percent of molecules with a carbon number of 16 carbons and 35 mole percent of molecules with a carbon number of 18 carbons.

22. The drilling fluid of claim 1 wherein the drilling fluid has an improved toxicity of at least about 30 percent over both a toxicity of the first fluid component alone and the second drilling fluid component alone.

23. The drilling fluid of claim 1 wherein the drilling fluid includes less than about 0.00001 grams of polycyclic aromatic hydrocarbons per gram of a base fluid.

24. The drilling fluid of claim 1 wherein the drilling fluid includes less than about 0.00001 grams of polycyclic aromatic hydrocarbons per gram of a base fluid as measured by Method 1654A, as published in Methods for the Determination of Diesel, Mineral and Cruse Oils in Offshore Oil and Gas Industry Discharges.

25. The drilling fluid of claim 1 wherein the drilling fluid has a minimum 96-hour LC50 of 30,000 ppm in a seawater to drilling fluid suspended particulate phase (SPP) volumetric ratio using *Mysidopsis bahia* or *Mysis relicta* as identified in Appendix 2 to Subpart A of Part 435—Drilling Fluids Toxicity Test (EPA Method 1619) in 40 CFR Part 435.

26. The drilling fluid of claim 1 wherein said linear olefin portion component is not isomerized or hydrogenated.

27. The drilling fluid of claim 1 further comprising linear alpha olefins, linear internal olefins, branched olefins, branched internal olefins, esters, water, mineral oils, enhanced mineral oils, oil-in-water emulsions, water-in-oil emulsions, paraffins, fatty acids, or mixtures thereof.

28. A drilling fluid suitable for use in environmentally sensitive areas, wherein the fluid passes pre-screening in accordance with OSPAR Recommendation 2000/4, as amended by OSPAR Recommendation 2008/1 and 2010/4, 2012-05, with a Marine Bodis of at least 60% as measured by OECD 301A, B, C, D or F and receives an OCNS grouping of either D, with a minimum aquatic toxicity of >100 and a minimum Sediment toxicity of >1,000, with no substitution warning, as listed on the Centre for Environment, Fisheries and Aquaculture Science (CEFAS) definitive ranked lists of registered products.

29. A drilling fluid suitable for use in environmentally sensitive areas, wherein the fluid passes pre-screening in accordance with OSPAR Recommendation 2000/4, as amended by OSPAR Recommendation 2008/1 and 2010/4, 2012-05, with a Marine Bodis of at least 60% as measured by OECD 301A, B, C, D or F and receives an OCNS grouping of either E, with a minimum aquatic toxicity of >1000 and a minimum Sediment toxicity of >10,000, with no substitution warning, as listed on the Centre for Environment, Fisheries and Aquaculture Science (CEFAS) definitive ranked lists of registered products.

30. A drilling fluid suitable for use in environmentally sensitive areas, where in the fluid meets the following criteria; has a flashpoint of at least 120° C. using ASTM D 93, a Kinematic Viscosity @ 40° C. of <3 centistokes, and a Log Pow of >3 as measured by OECD 117, and a density of 0.79-0.82 as measured by ASTM D 1298 with >90% Olefin content, as specified by CONAMA Resolution 23/94 (National Council for the Environment) and administered by Brazilian Institute of Environment and Renewable Natural Resources (IBAMA).

\* \* \* \* \*